United States Patent
Kamata

(10) Patent No.: US 10,328,949 B2
(45) Date of Patent: Jun. 25, 2019

(54) SENSOR BLIND SPOT INDICATION FOR VEHICLES

(71) Applicant: Toyota Motor Engineering & Manufacturing North America, Inc., Erlanger, KY (US)

(72) Inventor: Nobuhide Kamata, Ann Arbor, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 0 days.

(21) Appl. No.: 15/008,518

(22) Filed: Jan. 28, 2016

(65) Prior Publication Data

US 2017/0221359 A1 Aug. 3, 2017

(51) Int. Cl.
 *B60W 50/02* (2012.01)
 *B60W 50/08* (2012.01)
 *B60K 35/00* (2006.01)
 *G07C 5/08* (2006.01)
 *G08G 1/16* (2006.01)
(Continued)

(52) U.S. Cl.
 CPC .......... *B60W 50/085* (2013.01); *B60K 35/00* (2013.01); *B60W 50/14* (2013.01); *G07C 5/0825* (2013.01); *G07C 5/0833* (2013.01); *G08G 1/166* (2013.01); *G08G 1/167* (2013.01); *B60K 2350/2052* (2013.01); *B60W 2050/143* (2013.01); *H04L 67/12* (2013.01)

(58) Field of Classification Search
 USPC ..................................................... 701/23–28
 See application file for complete search history.

(56) References Cited

U.S. PATENT DOCUMENTS 6,817,740 B2 * 11/2004 Kobayashi ............. B60Q 1/085
 362/276
8,280,621 B2 * 10/2012 Edwards ................. G01S 7/062
 340/435
(Continued)

FOREIGN PATENT DOCUMENTS

JP H11115544 A 4/1999

OTHER PUBLICATIONS

Nikolić, "Embedded Vision in Advanced Driver Assistance Systems", Advances in Embedded Computer Vision, Nov. 26, 2014, pp. 45-69, Springer International Publishing, Switzerland (25 pages).

(Continued)

*Primary Examiner* — Jonathan L Sample
(74) *Attorney, Agent, or Firm* — Christopher G. Darrow; Darrow Mustafa PC

(57) ABSTRACT

A vehicle can be configured to indicate sensor blind spots to a vehicle occupant (e.g., a driver). Using one or more sensors, the vehicle can acquire driving environment data of an external environment of the vehicle. It can be determined whether one or more portions of the acquired driving environment data is unreliable. Responsive to determining that one or more portions of the acquired driving environment data is unreliable, an alert can be caused to be presented within the vehicle. The alert can indicate one or more locations in the external environment in which the driving environment data that is determined to be unreliable. In some instances, the alert can be a visual alert and/or an audial alert.

26 Claims, 3 Drawing Sheets

(51) Int. Cl.
*B60W 50/14* (2012.01)
*H04L 29/08* (2006.01)

(56) References Cited

U.S. PATENT DOCUMENTS

| | | | | |
|---|---|---|---|---|
| 8,589,014 | B2 * | 11/2013 | Fairfield | G05D 1/024 |
| | | | | 701/28 |
| 8,645,001 | B2 * | 2/2014 | Basson | G08G 1/167 |
| | | | | 359/22 |
| 9,020,679 | B2 * | 4/2015 | Zini | G05B 19/41895 |
| | | | | 701/23 |
| 9,434,382 | B1 * | 9/2016 | Prokhorov | G05D 1/0293 |
| 9,487,139 | B1 * | 11/2016 | Ishida | B60W 50/14 |
| 9,794,797 | B2 * | 10/2017 | Hoffberg | G06Q 10/0631 |
| 2004/0143695 | A1 * | 7/2004 | Hashimoto | B60W 50/0205 |
| | | | | 711/1 |
| 2005/0021201 | A1 * | 1/2005 | Klotz | B60W 30/16 |
| | | | | 702/189 |
| 2006/0164230 | A1 * | 7/2006 | DeWind | B60K 35/00 |
| | | | | 340/461 |
| 2007/0013497 | A1 * | 1/2007 | Watanabe | B60Q 9/008 |
| | | | | 340/435 |
| 2007/0087756 | A1 * | 4/2007 | Hoffberg | G06Q 10/0631 |
| | | | | 455/450 |
| 2007/0198145 | A1 * | 8/2007 | Norris | B60T 7/22 |
| | | | | 701/23 |
| 2008/0140278 | A1 * | 6/2008 | Breed | G06F 8/65 |
| | | | | 701/31.4 |
| 2009/0045928 | A1 * | 2/2009 | Rao | B60Q 9/006 |
| | | | | 340/435 |
| 2010/0315215 | A1 * | 12/2010 | Yuda | H04N 5/2259 |
| | | | | 340/435 |
| 2012/0310466 | A1 * | 12/2012 | Fairfield | G05D 1/024 |
| | | | | 701/28 |
| 2013/0332061 | A1 * | 12/2013 | Dowdall | B60R 21/00 |
| | | | | 701/301 |
| 2014/0020098 | A1 * | 1/2014 | Stahlin | G08G 1/163 |
| | | | | 726/22 |
| 2014/0214255 | A1 * | 7/2014 | Dolgov | G05D 1/0248 |
| | | | | 701/23 |
| 2014/0218213 | A1 * | 8/2014 | Schneider | G08G 1/167 |
| | | | | 340/905 |
| 2015/0100179 | A1 * | 4/2015 | Alaniz | A63F 13/00 |
| | | | | 701/1 |
| 2015/0100216 | A1 * | 4/2015 | Rayes | B60W 30/143 |
| | | | | 701/96 |
| 2015/0244826 | A1 * | 8/2015 | Stenneth | H04Q 9/00 |
| | | | | 709/213 |
| 2015/0266488 | A1 * | 9/2015 | Solyom | B60W 50/0205 |
| | | | | 701/28 |
| 2015/0266489 | A1 * | 9/2015 | Solyom | B60W 50/029 |
| | | | | 701/23 |
| 2015/0314780 | A1 * | 11/2015 | Stenneth | B60W 30/00 |
| | | | | 701/23 |
| 2016/0086391 | A1 * | 3/2016 | Ricci | G07C 5/008 |
| | | | | 701/29.3 |
| 2016/0179093 | A1 * | 6/2016 | Prokhorov | B60W 40/00 |
| | | | | 701/2 |
| 2016/0210861 | A1 * | 7/2016 | Bergsagel | G08G 1/167 |
| 2016/0221500 | A1 * | 8/2016 | Sakai | B60Q 9/008 |
| 2016/0272201 | A1 * | 9/2016 | Kang | G05D 1/00 |
| 2016/0272215 | A1 * | 9/2016 | Laine | G08G 1/165 |
| 2016/0357188 | A1 * | 12/2016 | Ansari | G05D 1/0212 |
| 2016/0358477 | A1 * | 12/2016 | Ansari | G08G 1/167 |
| 2017/0036599 | A1 * | 2/2017 | Siddiqui | B60R 1/00 |
| 2017/0057502 | A1 * | 3/2017 | Pandita | G05D 1/0212 |
| 2017/0115387 | A1 * | 4/2017 | Luders | G01S 7/4972 |
| 2017/0120804 | A1 * | 5/2017 | Kentley | G05D 1/0088 |
| 2017/0210359 | A1 * | 7/2017 | Brandin | B60T 7/22 |

OTHER PUBLICATIONS

National Highway Traffic Safety Administration; "National Highway Traffic Safety Administration Preliminary Statement of Policy Concerning Automated Vehicles"; 2013 (14 pages).

* cited by examiner

SENSOR BLIND SPOT INDICATION FOR VEHICLES

FIELD

The subject matter described herein relates in general to vehicles and, more particularly, to vehicles configured to sense the external environment in which such vehicles operate.

BACKGROUND

Some vehicles include an operational mode in which a computing system is used to navigate and/or maneuver the vehicle along a travel route with minimal or no input from a human driver. Such vehicles are equipped with sensors that are configured to detect information about the surrounding environment, including the presence of objects in the environment. The computing systems are configured to process the detected information to determine how to navigate and/or maneuver the vehicle through the surrounding environment. The presence of some objects may affect the determination of how to navigate and/or maneuver the vehicle through the surrounding environment.

SUMMARY

In one respect, the present disclosure is directed to a method of indicating sensor blind spots for a vehicle. The method can include acquiring, using one or more sensors, driving environment data of an external environment of the vehicle. The method can also include determining whether one or more portions of the acquired driving environment data is unreliable. Responsive to determining that one or more portions of the acquired driving environment data is unreliable, the method can further include causing an alert to be presented within the vehicle. The alert can indicate one or more locations in the external environment which correspond to the acquired driving environment data that is determined to be unreliable.

In another respect, the present disclosure is directed to a sensor blind spot indication system for a vehicle. The system can include a sensor system. The sensor system can be configured to acquire driving environment data of at least a portion of the external environment of the vehicle. The system can include a processor operatively connected to the sensor system. The processor can be programmed to initiate executable operations. The executable operations can include determining whether one or more portions of the acquired driving environment data is unreliable. The executable operations can also include, responsive to determining that one or more portions of the acquired driving environment data is unreliable, causing an alert to be presented within the vehicle. The alert can indicate one or more locations in the external environment which correspond to the driving environment data that is determined to be unreliable.

In still another respect, the present disclosure is directed to a computer program product for a vehicle. The computer program product can include a computer readable storage medium having program code embodied therein. The program code is executable by a processor to perform a method. The method can include acquiring, using one or more sensors, driving environment data of an external environment of the vehicle. The method can also include determining whether one or more portions of the acquired driving environment data is unreliable. Responsive to determining that one or more portions of the acquired driving environment data is unreliable, the method can further include causing an alert to be presented within the vehicle. The alert can indicate one or more locations in the external environment which correspond to the driving environment data that is determined to be unreliable.

DETAILED DESCRIPTION

This detailed description relates to the operation of a vehicle in situations in which there are one or more sensor blind spots. "Sensor blind spot" includes any portion(s) of an external environment of a vehicle in which sensor detection is unreliable. Driving environment data of an external environment of the vehicle can be acquired using one or more sensors. In response to determining that one or more portions of the acquired driving environment data is unreliable, an alert can be presented or caused to be presented within the vehicle. The alert can indicate one or more locations in the external environment which correspond to the driving environment data that is determined to be unreliable. The present detailed description relates to systems, methods and computer program products that incorporate one or more of such features. In at least some instances, such systems, methods and computer program products can improve the performance and/or the safe operation of a vehicle.

Figure 2:
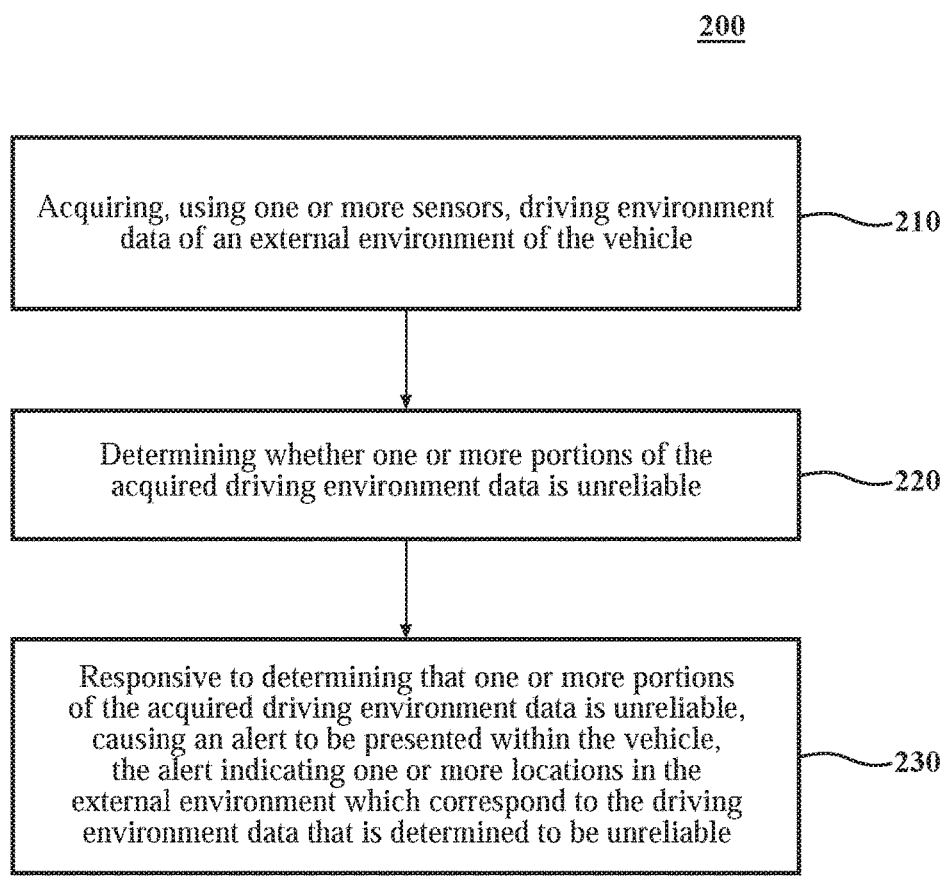
FIG. 2 is an example of a method of indicating sensor blind spots for a vehicle.
Figure 3:
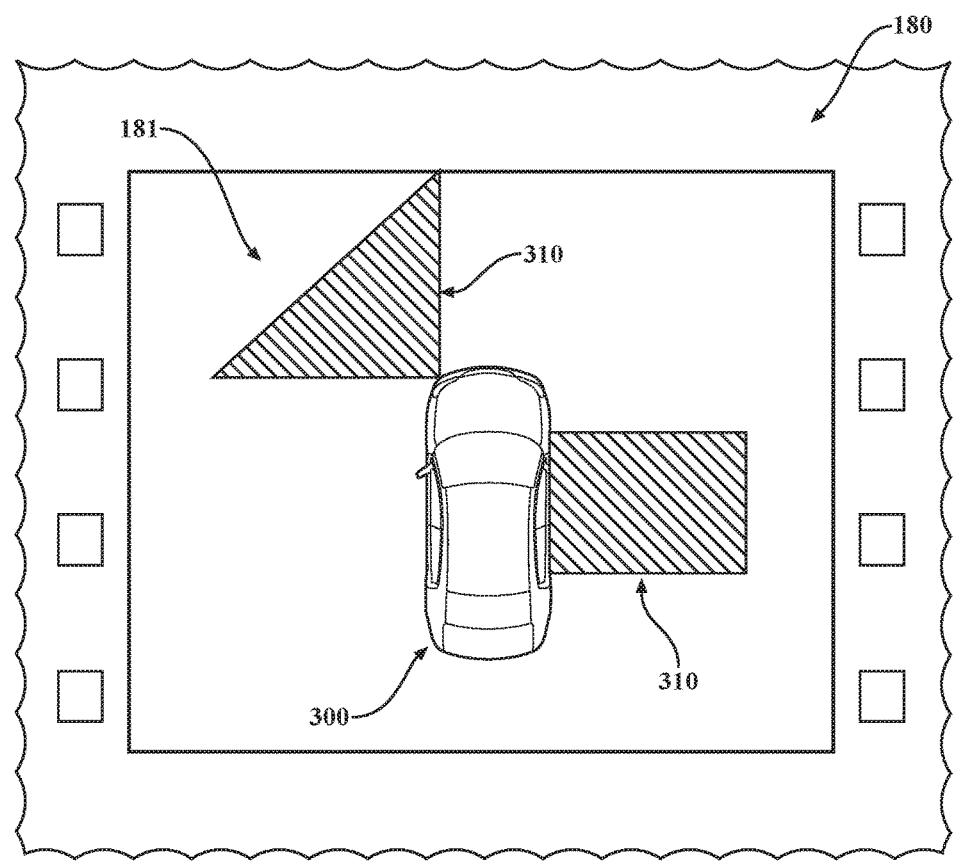
FIG. 3 is an example of a display located within a vehicle, showing an alert is presented on the display.

Detailed embodiments are disclosed herein; however, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-3, but the embodiments are not limited to the illustrated structure or application.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details.

Figure 1:
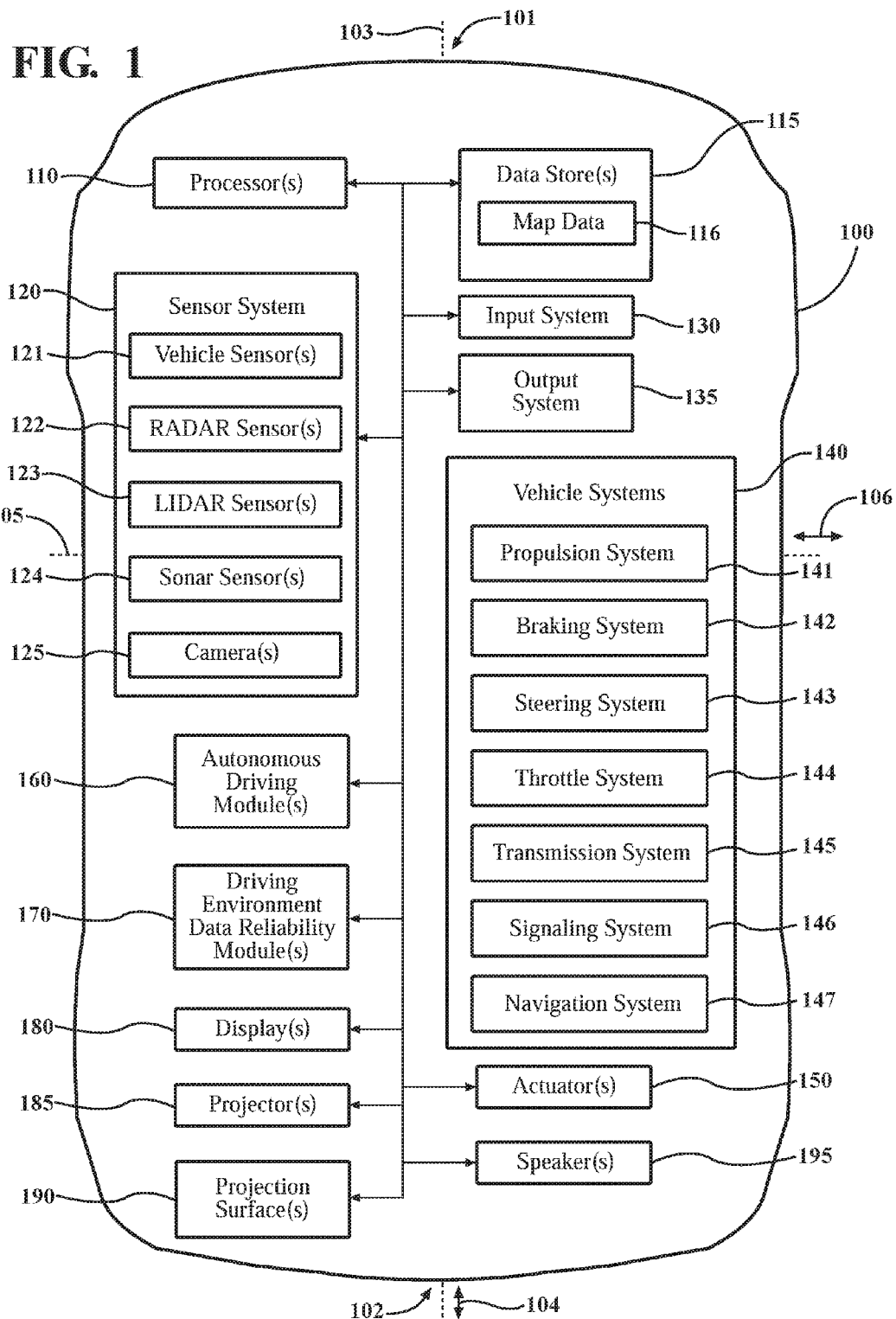
FIG. 1 is an example of a vehicle.

Referring to FIG. 1, an example a vehicle 100 is shown. As used herein, "vehicle" means any form of motorized transport. In one or more implementations, the vehicle 100 can be an automobile. While arrangements will be described herein with respect to automobiles, it will be understood that embodiments are not limited to automobiles. In some implementations, the vehicle 100 may be a watercraft, an aircraft or any other form of motorized transport.

According to arrangements herein, the vehicle 100 can be an autonomous vehicle. As used herein, "autonomous vehicle" means a vehicle that configured to operate in an autonomous operational mode. "Autonomous operational mode" means that one or more computing systems are used to navigate and/or maneuver the vehicle along a travel route with minimal or no input from a human driver. In one or more arrangements, the vehicle 100 can be highly automated.

The vehicle 100 can have a plurality of autonomous operational modes. For instance, the vehicle 100 can have an unmonitored autonomous operational mode. "Unmonitored autonomous operational mode" means that one or more computing systems are used to navigate and/or maneuver the vehicle along a travel route with no input or supervision required from a human driver. As an example, the unmonitored autonomous operational mode can include Level 4 (L4), as defined by the National Highway Traffic Safety Administration in its Preliminary Statement of Policy Concerning Automated Vehicles (May 30, 2013) ("NHTSA 2013 Policy"), which is incorporated herein by reference. The vehicle 100 can have a monitored autonomous operational mode. "Monitored autonomous operational mode" means that one or more computing systems are used to navigate and/or maneuver the vehicle with at least some human driver supervision required. As an example, the monitored autonomous operational mode can include Level 3 or L3, as defined by the NHTSA 2013 Policy. In some instances, when the vehicle 100 is in a monitored autonomous operational mode, a signal (e.g., an audial signal, a visual signal, a haptic signal, etc.) can be presented to a human driver to take an action within a predetermined amount of time. If such action is not taken within the predetermined amount of time, one or more safety maneuvers can be implemented.

Alternatively or in addition to the above-described modes, the vehicle 100 can have one or more semi-autonomous operational modes. "Semi-autonomous operational mode" means that a portion of the navigation and/or maneuvering of the vehicle along a travel route is performed by one or more computing systems, and a portion of the navigation and/or maneuvering of the vehicle along a travel route is performed by a human driver. As an example, the semi-autonomous operational mode can include Levels 2 (L2) and/or Level 1 (L1), as defined by the NHTSA 2013 Policy. One example of a semi-autonomous operational mode is when an adaptive cruise control system is activated. In such case, the speed of a vehicle can be automatically adjusted to maintain a safe distance from a vehicle ahead based on data received from on-board sensors, but the vehicle is otherwise operated manually by a human driver. Upon receiving a driver input to alter the speed of the vehicle (e.g. by depressing the brake pedal to reduce the speed of the vehicle), the adaptive cruise control system is deactivated and the speed of the vehicle is reduced.

Alternatively or in addition to the above-described modes, the vehicle 100 can have a manual operational mode. "Manual operational mode" means that a substantial majority or all of the navigation and/or maneuvering of the vehicle along a travel route is performed by a human driver with minimal or no input from a computing system. As an example, the manual operational mode can include Level 0 (L0), as defined by the NHTSA 2013 Policy.

The vehicle 100 can have a special operational mode. "Special operational mode" means that, if a requested human driver action is not taken or confirmed within a predetermined amount of time, the navigation and/or maneuvering of the vehicle can be controlled by one or more computing systems to implement one or more safety maneuvers. The safety maneuver can be a predetermined safety maneuver based on the current driving environment. For instance, if a human driver does not take control of the vehicle 100 within a predetermined amount of time, the safety maneuver may include moving the vehicle 100 to the side of the road, moving the vehicle 100 onto the shoulder of the road, reducing the speed of the vehicle 100, or bringing the vehicle 100 to a stop, just to name a few possibilities.

The vehicle 100 can be configured to be switched between the various operational modes. Such switching can be implemented in any suitable manner, now known or later developed. The switching can be performed automatically, or it can be done responsive to receiving a manual input or request.

In some instances, the vehicle 100 may be a conventional vehicle. A conventional vehicle is not configured for autonomous driving. Thus, a conventional vehicle does not have an autonomous operational mode. However, a conventional vehicle may have one or more semi-autonomous modes or features (e.g., cruise control, adaptive cruise control, lane keeping, etc.). However, in one or more arrangements, the conventional vehicle may not have semi-autonomous mode(s) or feature(s). In some instances, a conventional vehicle may be operable in only a manual operational mode. It will be appreciated that arrangements described herein are applicable to autonomous vehicles operating in any of the above-described modes, conventional vehicles, and/or other types of vehicles.

The vehicle 100 can have a forward end 101 and a rearward end 102. The vehicle 100 can have an associated longitudinal axis 103, which can be the central axis of the vehicle 100. The vehicle 100 can have an associated longitudinal direction 104. "Longitudinal direction" means any direction that is substantially parallel to and/or co-linear with the longitudinal axis 103. The vehicle 100 can have an associated lateral axis 105, which can be substantially perpendicular to the longitudinal axis 103. As used herein, the term "substantially" includes exactly the term it modifies and slight variations therefrom. Thus, the term "substantially perpendicular" means exactly perpendicular and slight variations therefrom. In this particular example, slight variations therefrom can include within normal manufacturing tolerances, within about 10 degrees or less, within about 5 degrees or less, within about 4 degrees or less, within about 3 degrees or less, within about 2 degrees or less, or within about 1 degree or less. The vehicle 100 can have an associated lateral direction 106. "Lateral direction" means any direction that is substantially parallel to and/or co-linear with the lateral axis 105.

The vehicle 100 can include various elements. In some instances, one or more of these elements may be a part of an autonomous driving system. Some of the possible elements of the vehicle 100 are shown in FIG. 1 and will now be described. It will be understood that it is not necessary for the vehicle 100 to have all of the elements shown in FIG. 1 or described herein. The vehicle 100 can have any combination of the various elements shown in FIG. 1. Further, the vehicle 100 can have additional elements to those shown in FIG. 1. In some arrangements, the vehicle 100 may not include one or more of the elements shown in FIG. 1. Further, while the various elements are shown as being located within the vehicle 100 in FIG. 1, it will be understood that one or more of these elements can be located external to the vehicle 100. Further, the elements shown may be physically separated by large distances.

The vehicle 100 can include one or more processors 110. "Processor" means any component or group of components that are configured to execute any of the processes described herein or any form of instructions to carry out such processes or cause such processes to be performed. The processor(s) 110 may be implemented with one or more general-purpose and/or one or more special-purpose processors. Examples of suitable processors include microprocessors, microcontrollers, DSP processors, and other circuitry that can execute software. Further examples of suitable processors include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller. The processor(s) 110 can include at least one hardware circuit (e.g., an integrated circuit) configured to carry out instructions contained in program code. In arrangements in which there is a plurality of processors 110, such processors can work independently from each other or one or more processors can work in combination with each other. In one or more arrangements, the processor(s) 110 can be a main processor of the vehicle 100. For instance, the processor(s) 110 can be an electronic control unit (ECU).

The vehicle 100 can include one or more data stores 115 for storing one or more types of data. The data store 115 can include volatile and/or non-volatile memory. Examples of suitable data stores 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store 115 can be a component of the processor(s) 110, or the data store 115 can be operatively connected to the processor(s) 110 for use thereby. The term "operatively connected," as used throughout this description, can include direct or indirect connections, including connections without direct physical contact.

In one or more arrangements, the one or more data stores 115 can include map data. The map data can include maps of one or more geographic areas. The map data can include information or data on roads, traffic control devices, road markings, structures, features, and/or landmarks in the one or more geographic areas. The map data can be in any suitable form. In some instances, the map data can include aerial views of an area. In some instances, the map data can include ground views of an area, including 360 degree ground views. The map data can include measurements, dimensions, distances, and/or information for one or more items included in the map data and/or relative to other items included in the map data. The map data can include terrain data. The terrain data can include information about the terrain of one or more geographic areas. The terrain data can include elevation data in the one or more geographic areas. The map data can include a digital map with information about road geometry. The map data can be high quality and/or highly detailed.

In some instances, at least a portion of the map data can be located in one or more data stores 115 located onboard the vehicle 100. Alternatively or in addition, at least a portion of the data can be located in a data store or source that is located remote from the vehicle 100. The data can be obtained by the vehicle 100 in any suitable manner, or it can be provided by an entity (e.g., a vehicle manufacturer) for use by the vehicle 100.

The vehicle 100 can include a sensor system 120. The sensor system 120 can include one or more sensors. "Sensor" means any device, component and/or system that can detect, determine, assess, monitor, measure, quantify and/or sense something. The one or more sensors can be configured to detect, determine, assess, monitor, measure, quantify and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors can work independently from each other. Alternatively, two or more of the sensors can work in combination with each other. In such case, the two or more sensors can form a sensor network. The sensor system 120 and/or the one or more sensors can be operatively connected to the processor(s) 110, the data store(s) 115, and/or other element of the vehicle 100 (including any of the elements shown in FIG. 1). The sensor system 120 can acquire data of at least a portion of the external environment of the vehicle 100.

The sensor system 120 can include any suitable type of sensor. Various examples of different types of sensors will be described herein. However, it will be understood that the embodiments are not limited to the particular sensors described.

The sensor system 120 can include one or more vehicle sensors 121. The vehicle sensor(s) 121 can be configured to detect, determine, assess, monitor, measure, quantify and/or sense information about the vehicle 100 itself. In one or more arrangements, the vehicle sensor(s) 121 can be configured to detect, determine, assess, monitor, measure, quantify and/or sense position and orientation changes of the vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a global positioning system (GPS), a navigation system 147, and/or other suitable sensors. The vehicle sensor(s) 121 can be configured to detect, determine, assess, monitor, measure, quantify, and/or sense one or more characteristics of the vehicle 100. In one or more arrangements, the vehicle sensor(s) 121 can include a speedometer (not shown). The speedometer can determine a current speed of the vehicle 100, or data acquired by the speedometer can be used to determine a current speed of the vehicle 100.

Alternatively or in addition, the sensor system 120 can include one or more driving environment sensors configured to acquire, detect, determine, assess, monitor, measure, quantify and/or sense driving environment data. "Driving environment data" includes and data or information about the external environment in which a vehicle is located or one or more portions thereof. For example, the one or more driving environment sensors can be configured to detect, determine, assess, monitor, measure, quantify and/or sense objects in at least a portion of the external environment of the vehicle 100 and/or information/data about such objects. Such objects may be stationary objects and/or dynamic objects. The one or more driving environment sensors can be configured to detect, determine, assess, monitor, measure, quantify and/or sense other things in the external environment of the vehicle 100, such as, for example, lane markers, signs, traffic lights, traffic signs, lane lines, crosswalks, curbs proximate the vehicle 100, off-road objects, etc. In one or more arrangements, the one or more driving environment sensors can include a global navigation satellite system (GNSS), a global positioning system (GPS), a navigation system (which can be navigation system 147 described below), and/or other suitable sensors.

Various examples of sensors of the sensor system 120 will be described herein. The example sensors may be part of the one or more driving environment sensors and/or the one or more vehicle sensors 121. However, it will be understood that the embodiments are not limited to the particular sensors described.

As an example, in one or more arrangements, the sensor system 120 can include one or more RADAR sensors 122. "RADAR sensor" means any device, component and/or system that can detect, determine, assess, monitor, measure, quantify and/or sense something using at least in part radio signals. The one or more RADAR sensors 122 can be configured to detect, determine, assess, monitor, measure, quantify and/or sense, directly or indirectly, the presence of one or more objects in the external environment of the vehicle 100, the position of each detected object relative to the vehicle 100, the distance between each detected object and the vehicle 100 in one or more directions (e.g. in the longitudinal direction 104, the lateral direction 106 and/or other direction(s)), —the elevation of each detected object, the speed of each detected object and/or the movement of each detected object. The one or more RADAR sensors 122, or data obtained thereby, can determine the speed of objects in the external environment of the vehicle 100. Three dimensional coordinate information can be associated with the data acquired by the one or more RADAR sensors 122.

In one or more arrangements, the sensor system 120 can include one or more LIDAR sensors 123. "LIDAR sensor" means any device, component and/or system that can detect, determine, assess, monitor, measure, quantify and/or sense objects using at least in part lasers. The LIDAR sensor can include a laser source and/or laser scanner configured to emit a laser signal and a detector configured to detect reflections of the laser signal. The one or more LIDAR sensors 123 can be configured to detect, determine, assess, monitor, measure, quantify and/or sense, directly or indirectly, the presence of one or more objects in the external environment of the vehicle 100, the position of each detected object relative to the vehicle 100, the distance between each detected object and the vehicle 100 in one or more directions (e.g. in the longitudinal direction 104, the lateral direction 106 and/or other direction(s)), the elevation of each detected object, the speed of each detected object, and/or the movement of each detected object.

In one or more arrangements, the sensor system 120 can include one or more sonar sensors 124. "Sonar sensor" means any device, component and/or system that can detect, determine, assess, monitor, measure, quantify and/or sense something using at least in part sound waves. The one or more sonar sensors 124 can be configured to detect, determine, assess, monitor, measure, quantify and/or sense, directly or indirectly, the presence of one or more objects in the external environment of the vehicle 100, the position of each detected object relative to the vehicle 100, the distance between each detected object and the vehicle 100 in one or more directions (e.g. in the longitudinal direction 104, the lateral direction 106 and/or other direction(s)), the elevation of each detected object, the speed of each detected object, and/or the movement of each detected object.

The sensor system 120 can include can include one or more cameras 125. "Camera" includes any device(s), component(s), and/or system(s) that is configured to capture visual data. "Visual data" includes video and/or image information/data. The visual data can be in any suitable form. In one or more arrangements, one or more of the cameras 126 can be oriented, positioned, configured, operable, and/or arranged to capture visual data from at least a portion of the external environment of the vehicle 100. Visual data acquired by the one or more cameras 125 can be used to detect, determine, assess, monitor, measure, quantify and/or sense, directly or indirectly, the presence of one or more objects in the external environment of the vehicle 100, the position of each detected object relative to the vehicle 100, the distance between each detected object and the vehicle 100 in one or more directions, the elevation of each detected object, the speed of each detected object, and/or the movement of each detected object.

The one or more cameras 125 can be high resolution cameras. The high resolution can refer to the pixel resolution, the spatial resolution, spectral resolution, temporal resolution and/or radiometric resolution. In one or more arrangements, the one or more cameras 125 can be high dynamic range (HDR) cameras or infrared (IR) cameras. The one or more cameras 125 can capture visual data in any suitable wavelength on the electromagnetic spectrum.

The sensor system 120, the processor(s) 110, and/or one or more other elements of the vehicle 100 can be operable to control movements of one or more of the sensors of the sensor system 120. It should be noted that any of the sensors described herein can be provided in any suitable location with respect to the vehicle 100. For instance, one or more sensors can be located within the vehicle 100, one or more sensors can be located on the exterior of the vehicle 100 and/or one or more sensors can be located so as to be exposed to the exterior of the vehicle 100.

Alternatively or in addition to one or more of the above examples, the sensor system 120 can include one or more sensors configured to detect, determine, assess, monitor, measure, quantify and/or sense the location of the vehicle 100 and/or the location of objects in the environment relative to the vehicle 100. Any suitable sensor can be used for such purposes. Such sensors may work independently and/or in combination with a positioning system of the vehicle 100.

The vehicle 100 can include an input system 130. An "input system" includes any device, component, system, element or arrangement or groups thereof that enable information/data to be entered into a machine. The input system 130 can receive an input from a vehicle occupant (e.g. a driver or a passenger). Any suitable input system 130 can be used, including, for example, a keypad, display, touch screen, multi-touch screen, button, joystick, mouse, trackball, microphone and/or combinations thereof.

The vehicle 100 can include an output system 135. An "output system" includes any device, component, system, element or arrangement or groups thereof that enable information/data to be presented to a vehicle occupant (e.g. a person, a vehicle occupant, etc.). The output system 135 can present information/data to a vehicle occupant. The output system 135 can include a display. Alternatively or in addition, the output system 135 may include a microphone, earphone and/or speaker. Some components of the vehicle 100 may serve as both a component of the input system 130 and a component of the output system 135.

The output system 135 can present information/data to a vehicle occupant. The output system 135 can include one or more displays 180. "Display" is defined as a component or a group of components that present information/data in a form that is perceptible to the human sense of sight. For instance, the display 180 can present video, images, graphics, etc. The display 180 can be any suitable type of display. For instance, the display 180 can be a liquid crystal display (LCD), a light emitting diode (LED) display or some other suitable display. In one or more arrangements, the display 180 can be a heads-up display, a display for a navigation system, and/or a display included in an instrument cluster. The display(s) 180 can be provided in any suitable location within the vehicle 100. In one or more arrangements, the display(s) 180 can be located in a front interior portion of the vehicle 100. As an example, the display(s) 180 can be included in a dashboard or instrument panel (not shown) of the vehicle 100.

Alternatively or in addition, the output system 135 can include one or more projectors 185. The projector(s) 185 can be configured to present visual data on one or more projection surfaces. The vehicle 100 can include one or more projection surfaces 190. Examples of projection surfaces 190 can be a window (e.g., the front windshield, a side window, etc.), a wall, a panel, or a screen, just to name a few possibilities. The projector(s) 185 and/or the projection surface(s) 190 may be part of a heads-up display system.

The output system 135 can include one or more speakers 1595 "Speaker" means one or more elements, one or more devices, one or more components, one or more systems, and/or any combination thereof that produce sound in response to an audio signal input. Examples of speakers include, for example, electroacoustic transducers, sound chips, and sound cards. Each speaker 195 can have one or more audio output channels (not shown) operatively connected thereto. "Audio output channel" means any suitable device, component or structure for carrying audio signals. In one or more arrangements, the vehicle 100 can include a plurality of speakers 195. The plurality of speakers 195 can be distributed about the vehicle 100 in any suitable manner.

The vehicle 100 can include one or more modules, at least some of which will be described herein. The modules can be implemented as computer readable program code that, when executed by a processor, implement one or more of the various processes described herein. One or more of the modules can be a component of the processor(s) 110, or one or more of the modules can be executed on and/or distributed among other processing systems to which the processor(s) 110 is operatively connected. The modules can include instructions (e.g., program logic) executable by one or more processor(s) 110. Alternatively or in addition, one or more data store 115 may contain such instructions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

The vehicle 100 can include one or more autonomous driving modules 160. The autonomous driving module(s) 160 can receive data from the sensor system 120 and/or any other type of system capable of capturing information relating to the vehicle 100 and/or the external environment of the vehicle 100. In one or more arrangements, the autonomous driving module(s) 160 can use such data to generate one or more driving scene models. The autonomous driving module(s) 160 can determine position and velocity of the vehicle 100. The autonomous driving module(s) 160 can determine the location of obstacles, objects, or other environmental features including traffic signs, trees, shrubs, neighboring vehicles, pedestrians, etc.

The autonomous driving module(s) 160 can be configured to receive, capture, and/or determine location information for objects within the external environment of the vehicle 100 for use by the processor(s) 110, and/or one or more of the modules described herein to estimate position and orientation of the vehicle 100, vehicle position in global coordinates based on signals from a plurality of satellites, or any other data and/or signals that could be used to determine the current state of the vehicle 100 or determine the position of the vehicle 100 in respect to its environment for use in either creating a map or determining the position of the vehicle 100 in respect to map data.

The autonomous driving module(s) 160 can be configured to determine travel path(s), current autonomous driving maneuvers for the vehicle 100, future autonomous driving maneuvers and/or modifications to current autonomous driving maneuvers based on data acquired by the sensor system 120, driving scene models, and/or data from any other suitable source. "Driving maneuver" means one or more actions that affect the movement of a vehicle. Examples of driving maneuvers include: accelerating, decelerating, braking, turning, moving in a lateral direction of the vehicle 100, changing travel lanes, merging into a travel lane, and/or reversing, just to name a few possibilities. The autonomous driving module(s) 160 can be configured can be configured to implement determined driving maneuvers. The autonomous driving module(s) 160 can cause, directly or indirectly, such autonomous driving maneuvers to be implemented. As used herein, "cause" or "causing" means to make, force, compel, direct, command, instruct, and/or enable an event or action to occur or at least be in a state where such event or action may occur, either in a direct or indirect manner. The autonomous driving module(s) 160 can be configured to execute various vehicle functions and/or to transmit data to, receive data from, interact with, and/or control the vehicle 100 or one or more systems thereof (e.g. one or more of vehicle systems 140).

The vehicle 100 can include one or more driving environment data reliability modules 170. The driving environment data reliability modules 170 can be configured to determine whether data acquired by the sensor system 120 is reliable or unreliable. "Reliable" means that driving environment data is available, substantially complete, not substantially limited in range. If driving environment data is reliable, then the associated portion of the external environment is capable of being adequately monitored by one or more sensors of the sensor system 120. "Unreliable" means that driving environment data is unavailable, limited, incomplete, unobtainable, and/or not processed properly. If driving environment data is unreliable, then the associated portion of the external environment is not capable of being adequately monitored by one or more sensors of the sensor system 120.

Various non-limiting examples of when driving environment data may be determined to be unreliable will now be described. Driving environment data may be unreliable if there is an issue with one or more of the driving environment sensors. For instance, one or more driving environment sensors may be inoperative, deactivated, off, inactive, defective, faulting, malfunctioning, and/or otherwise not working properly. Further, one or more driving environment sensors (or other element to which the driving environment sensor(s) are operatively connected) may not properly process received driving environment data. The sensor system 120 can include one or more sensors to detect one or more instances in which driving environment sensors are not working properly or driving environment data received or processed thereby is unreliable. Alternatively or in addition, environmental conditions (e.g., rain, fog, and/or snow) may render one or more driving environment sensors incapable of delivering reliable information (e.g., complete occlusion, reduced detection range, incomplete data acquisition, etc.). Alternatively or in addition, one or more physical objects or barriers (e.g., buildings, walls, structures, large neighboring vehicles, etc.) in the external environment may occlude portions of the external environment from being detected.

Alternatively or in addition, the lack of map data 116 for at least a portion of the external environment can cause driving environment data to be determined to be unreliable. Further, some differences between an aspect of the detected external environment and an expected aspect of the external environment can cause driving environment data to be determined to be unreliable. For instance, if a particular terrain is expected in a portion of the driving environment based on map data is different from the terrain detected by the sensor system 120, then the acquired driving environment data can be determined to be unreliable. Such a situation may arise, for example, if there is snow on the ground or snowbanks along a road. Alternatively, if there is construction to a portion of a road or a new intersection and such information is not included in the map data, then driving environment data associated with at least that portion of the driving environment can be determined to be unreliable.

Responsive to determining that there are one or more sensor blind sports based on the acquired driving environment data being unreliable, an alert can be caused to be presented within the vehicle 100. Such causing can be performed by one or more elements of the vehicle 100, such as the driving environment data reliability module(s) 170, the autonomous driving module(s) 160, and/or the processor(s) 110.

The vehicle 100 can include one or more vehicle systems 140. Various examples of the one or more vehicle systems 140 are shown in FIG. 1. However, the vehicle 100 can include more, fewer, or different vehicle systems. It should be appreciated that although particular vehicle systems are separately defined, each or any of the systems or portions thereof may be otherwise combined or segregated via hardware and/or software within the vehicle 100. The vehicle 100 can include a propulsion system 141, a braking system 142, a steering system 143, throttle system 144, a transmission system 145, a signaling system 146, and/or a navigation system 147. Each of these systems can include one or more mechanisms, devices, elements, components, systems, and/or combination thereof, now known or later developed The navigation system 147 can include one or more mechanisms, devices, elements, components, systems, applications and/or combinations thereof, now known or later developed, configured to determine the geographic location of the vehicle 100 and/or to determine a travel route for the vehicle 100. The navigation system 147 can include one or more mapping applications to determine a travel route for the vehicle 100. The navigation system 147 can include a global positioning system, a local positioning system or a geolocation system.

The processor(s) 110 and/or the autonomous driving module(s) 160 can be operatively connected to communicate with the various vehicle systems 140 and/or individual components thereof. For example, returning to FIG. 1, the processor(s) 110 and/or the autonomous driving module(s) 160 can be in communication to send and/or receive information from the various vehicle systems 140 to control the movement, speed, maneuvering, heading, direction, etc. of the vehicle 100. The processor(s) 110 and/or the autonomous driving module(s) 160 may control some or all of these vehicle systems 140 and, thus, may be partially or fully autonomous.

The processor(s) 110 and/or the autonomous driving module(s) 160 can be operatively connected to communicate with the various vehicle systems 140 and/or individual components thereof. For example, returning to FIG. 1, the processor(s) 110 and/or the autonomous driving module(s) 160 can be in communication to send and/or receive information from the various vehicle systems 140 to control the movement, speed, maneuvering, heading, direction, etc. of the vehicle 100. The processor(s) 110 and/or the autonomous driving module(s) 160 may control some or all of these vehicle systems 140.

The processor(s) 110 and/or the autonomous driving module(s) 160 may be operable to control the navigation and/or maneuvering of the vehicle 100 by controlling one or more of the vehicle systems 140 and/or components thereof. For instance, when operating in an autonomous mode, the processor(s) 110 and/or the autonomous driving module(s) 160 can control the direction and/or speed of the vehicle 100. The processor(s) 110 and/or the autonomous driving module(s) 160 can cause the vehicle 100 to accelerate (e.g., by increasing the supply of fuel provided to the engine), decelerate (e.g., by decreasing the supply of fuel to the engine and/or by applying brakes) and/or change direction (e.g., by turning the front two wheels). As used herein, "cause" or "causing" means to make, force, compel, direct, command, instruct, and/or enable an event or action to occur or at least be in a state where such event or action may occur, either in a direct or indirect manner.

In some instances, such as when the vehicle 100 is an autonomous vehicle, the vehicle 100 can include one or more actuators 150. The actuators 150 can be any element or combination of elements operable to modify, adjust and/or alter one or more of the vehicle systems 140 or components thereof to responsive to receiving signals or other inputs from the processor(s) 110 and/or the autonomous driving module(s) 160. Any suitable actuator can be used. For instance, the one or more actuators 150 can include motors, pneumatic actuators, hydraulic pistons, relays, solenoids, and/or piezoelectric actuators, just to name a few possibilities. However, when the vehicle 100 is a conventional vehicle, the vehicle 100 may or may not include the one or more actuators 150.

According to arrangements herein, the vehicle 100 can be configured to provide a vehicle occupant (e.g., the driver) with an indication of one or more sensor blind spots while operating in an autonomous operational mode. The sensor blind spot indication can be provided in any suitable manner. For instance, such an indication can be provided by a sensor blind sport alert. The alert can be output within the vehicle 100.

The sensor blind sport alert can have any suitable type of alert. For instance, the sensor blind sport alert can be a visual alert and/or an audial alert. "Visual alert" is any output that provides information in a manner that is perceptible to the human sense of sight. "Audial alert" is any output that provides information in a manner that is perceptible to the human sense of hearing. In some instances, alternatively or in addition, the sensor blind sport alert can be a haptic alert. "Haptic alert" is any output that provides information in a manner that is perceptible to the human sense of touch. Various non-limiting examples of sensor blind sport alerts will now be provided. The sensor blind sport alerts can be presented in real-time.

A visual sensor blind sport alert can be presented to the vehicle occupant (e.g., the driver) using the output system 135. For instance, the visual sensor blind sport alert can be presented on one or more of displays 180 (see FIG. 3). The display 180 can include a screen 181. In one or more arrangements, the visual alert can be presented on one or more projection surfaces 190 by the one or more projectors 185.

The visual alert can have any suitable form. In one or more arrangements, the visual alert can be a word, a phrase or a message presented on the display 180 or projection surface 190. As an example, the visual alert may be: "Sensor Blind Spot—left front" or "Sensor Blind Spot—right lateral side." In one or more arrangements, the visual alert can include a graphical representation of the sensor blind spots. For instance, the visual alert can include a graphical representation 300 of the vehicle 100, as is shown in FIG. 3. Further, one or more area surrounding the graphical representation 300 of the vehicle 100 can be selectively illuminated, highlighted, and/or marked to provide a graphical representation 310 of one or more sensor blind spots. In some instances, the graphical representations 310 of the sensor blind spots can be selectively sized and/or shaped corresponding to the size and/or shape of the sensor blind spot. For instance, as is shown in FIG. 3, one of the representations can be triangular shaped, and another one of the graphical representations 310 can be rectangular. The size and/or shape of the graphical representation(s) 300 of the sensor blind spots can be adjusted in real-time.

It should be noted that the graphical representations 310 of the sensor blind spots can be provided in locations that spatially correspond to the one or more locations in the external environment in which the driving environment data that is determined to be unreliable. In this way, a vehicle occupant can be visually apprised of the locations of the one or more the sensor blind spots.

Alternatively or in addition, the visual sensor blind spot alert can be presented by one or more light sources (not shown). The one or more light sources can generate or emit any type of light energy. In one or more arrangements, the one or more light sources can include one or more of the following types of electric-powered light sources: electron-stimulated, incandescent lamps, electroluminescent (EL) lamps, gas discharge lamps, high-intensity discharge lamps and/or lasers, just to name a few possibilities. In one or more arrangements, the one or more light sources can be light emitting diodes (LEDs). In one or more arrangements, a plurality of light sources can be provided. The plurality of light sources can be distributed throughout the interior of the vehicle 100. One or more of the light sources can be activated to illuminate in locations that spatially correspond to the one or more locations in the external environment in which the driving environment data that is determined to be unreliable. In this way, a vehicle occupant can be visually apprised of the locations of the one or more the sensor blind spots.

Alternatively or in addition, an audial sensor blind sport alert can be presented to the vehicle occupant (e.g., the driver) using the output system 135. For instance, the audial sensor blind sport alert can be presented by one or more components of the output system 135, such as by being emitted over one or more speakers 195 or over one or more in-vehicle audio channels. "Speaker" means one or more elements, one or more devices, one or more components, one or more systems, and/or any combination thereof that produce sound in response to an audio signal input. Examples of speakers include, for example, electroacoustic transducers, sound chips, and sound cards. Each speaker 195 can have one or more audio output channels (not shown) operatively connected thereto. "Audio output channel" means any suitable device, component or structure for carrying audio signals.

The audial sensor blind sport alert can have any suitable form. For instance, the audial sensor blind sport alert can be a sound and/or a message (e.g., word(s), phrase(s), and/or sentence(s)). As an example, the audial sensor blind spot alert can indicate: "Sensor Blind Spot—left front" or "Sensor Blind Spot—right lateral side."

In one or more arrangements, a plurality of speakers 195 can be provided. The plurality of speakers 195 can be distributed in various locations of the vehicle 100. One or more of the speakers 195 can be activated to emit sound(s) in location(s) that spatially correspond to the location(s) in the external environment in which the driving environment data that is determined to be unreliable. In this way, a vehicle occupant can be audibly apprised of the locations of the one or more the sensor blind spots. For example, if there is a building that is obstructing the driving environment to the front-right of the vehicle 100, a sound can be played or emitted from the front right of the vehicle 100 to indicate that direction of the obstruction.

In some instances, though properly functioning, the driving environment sensors may not be able to detect certain parts of the external environment of the vehicle 100. For instance, one or more of the sensors may be in a fixed or temporary position that faces away from a portion of the external environment, which results in one or more parts of the external environment that cannot be detected by the driving environment sensors. With respect to these type of sensor blind spots, the vehicle 100 can be configured to present a visual indicator within the vehicle 100 of the portion(s) of the external environment that the environmental sensors are not detecting and/or otherwise not facing. Such an indicator can inform a driver of the locations in the external environment that are not being detected by and/or faced by the driving environment sensors. With such information, a driver would check such area(s) of the external environment to ensure safety. In one or more arrangements, an audial alert would not be provided in such instances, as the driving environment sensors are working as intended.

Now that the various potential systems, devices, elements and/or components of the vehicle 100 have been described, various methods of operating of the vehicle 100 will now be described. Referring now to FIG. 2, an example of a method of indicating sensor blind spots for a vehicle is shown. The method 200 will be described in connection with instances in which the second operational mode has a greater degree of manual involvement than the first operational mode. However, it will be understood that arrangements described herein are not limited in this respect. Indeed, in one or more arrangements, the method 200 can be implemented in instances in which the second operational mode has a lesser degree of manual involvement that the first operational mode.

Various possible steps of method 200 will now be described. The method 200 illustrated in FIG. 2 may be applicable to the embodiments described above in relation to FIGS. 1 and 3, but it is understood that the method 200 can be carried out with other suitable systems and arrangements. Moreover, the method 200 may include other steps that are not shown here, and in fact, the method 200 is not limited to including every step shown in FIG. 2. The steps that are illustrated here as part of the method 200 are not limited to this particular chronological order. Indeed, some of the steps may be performed in a different order than what is shown and/or at least some of the steps shown can occur simultaneously.

At block 210, driving environment data of an external environment of the vehicle can be acquired. When the vehicle 100 is an autonomous vehicle, the acquiring can be performed while the vehicle 100 is operating in an autonomous operational mode or in any other operational mode that the vehicle 100 is configured to operate in (e.g., semi-autonomous, manual, special, etc.). The acquiring can be performed using one or more driving environment sensors of the sensor system 120. For instance, the acquiring can be performed by one or more RADAR sensors 122, the one or more LIDAR sensors 123, the one or more sonar sensors 124, and/or the one or more cameras 125. It will be appreciated that driving environment data from some portions of the external environment may include data from a plurality of different types of driving environment sensors. It will also be appreciated that driving environment data from some portions of the external environment may include data from only a single type of driving environment sensor. The acquiring can be performed continuously, periodically, irregularly, or even randomly. The method 200 can continue to block 220.

At block 220, it can be determined whether one or more portions of the acquired driving environment data is unreliable. Such a determination can be made by the driving environment data reliability module(s) 170. Such a determination can be made continuously, periodically, irregularly, or even randomly. The determination can be made in real-time. The method 200 can continue to block 230.

At block 230, responsive to determining that one or more portions of the acquired driving environment data is unreliable, an alert can be caused to be presented within the vehicle 100. Such causing can be performed by one or more elements of the vehicle 100, such as the driving environment data reliability module(s) 170 and/or the processor(s) 110.

The alert can indicate one or more locations in the external environment in which the driving environment data that is determined to be unreliable. The alert can be presented in any suitable manner and in any suitable form (e.g., audial, visual, and/or haptic). The alert can be presented by the output system 135 (e.g., display(s) 180, projector(s) 185, and/or speaker(s) 195, etc.). In this way, any sensor blind spots of the vehicle 100 can be communication to a vehicle occupant. One or more characteristics of the alert can be varied to indicate the importance and/or urgency to the driver of the vehicle 100. In one or more arrangements, the alert can be presented within the vehicle 100 in one or more locations that spatially correspond to the one or more locations in the external environment in which the driving environment data that is determined to be unreliable. For example, if there is a sensor blind spot the forward right portion of the vehicle 100, the alert can spatially correspond to the forward right portion of the external environment. For instance, if the alert is an audial alert, then an audial alert can be presented from one or more speaker(s) 195 located in a forward right portion of the vehicle 100.

The method 200 can end. Alternatively, the method 200 can return to block 210. As a further alternative, the method 200 can include additional and/or alternative blocks (not shown). For instance, in one or more arrangements, if it is determined that the acquired driving environment data is reliable, then no alert is presented within the vehicle. Further, in one or more arrangements in which the vehicle 100 is an autonomous vehicle, the method 200 can include, responsive to determining that one or more portions of the driving environment data is unreliable, determining a modification to a current driving maneuver of the autonomous vehicle. The method can further include causing the determined modification to the current driving maneuver of the autonomous vehicle to be implemented. Any suitable modification can be made to the current driving maneuver of the autonomous vehicle. As an example, the determined modification to a current driving maneuver of the autonomous vehicle can include reducing a current speed of the autonomous vehicle. In one or more arrangements, if no driving environment data is available from at least a portion of the external environment (e.g., the sensors data is completely occluded), the method 200 can include causing the vehicle to transition to a manual operational mode or a special operational mode, as described above. Causing the vehicle to transition to such modes can be made by the driving environment data reliability module(s) 170, the autonomous driving module(s) 160, and/or the processor(s) 110.

It will be appreciated that arrangements described herein can provide numerous benefits, including one or more of the benefits mentioned herein. For example, arrangements described herein can improve the performance of a vehicle. Arrangements described herein can provide a degree of comfort and confidence to vehicle occupants by informing them of sensor blind spots and of the vehicle's awareness of such sensor blind spots. Arrangements described herein can also provide a degree of comfort and confidence to vehicle occupants and/or improve vehicle safety by modifying a current driving action and/or operational mode of the vehicle if sensor blind spots are detected. Arrangements described herein can provide information to a driver or that he or she can play closer attention to the particular location of the blind spot(s) around the vehicle. Thus, when the vehicle is an autonomous vehicle, the driver can take control of the autonomous vehicle or be ready to take control of the autonomous vehicle.

The flowcharts and block diagrams in the figures illustrate the architecture, functionality, and operation of possible implementations of systems, methods and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or other apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied or embedded, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk drive (HDD), a solid state drive (SSD), a random access memory (RAM), a read-only memory (ROM), an erasable programmable read-only memory (EPROM or Flash memory), an optical fiber, a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language). The phrase "at least one of . . . and . . . " as used herein refers to and encompasses any and all possible combinations of one or more of the associated listed items. As an example, the phrase "at least one of A, B and C" includes A only, B only, C only, or any combination thereof (e.g. AB, AC, BC or ABC).

Aspects herein can be embodied in other forms without departing from the spirit or essential attributes thereof. Accordingly, reference should be made to the following claims, rather than to the foregoing specification, as indicating the scope of the invention.

What is claimed is:

1. A method of indicating sensor blind spots for an autonomous vehicle, the method comprising:
   acquiring, using one or more sensors, driving environment data of an external environment of the autonomous vehicle;
   determining whether one or more portions of the acquired driving environment data is unreliable, the determining including:
      determining whether one or more physical objects or barriers in the external environment occlude portions of the external environment from being detected by at least one of the one or more sensors; and
      responsive to determining that one or more physical objects or barriers in the external environment occlude portions of the external environment from being detected by the at least one of the one or more sensors, determining that the portion of the acquired driving environment data associated with the at least one of the one or more sensors that are occluded by one or more physical objects to be unreliable; and
   responsive to determining that one or more portions of the acquired driving environment data is unreliable, causing an alert to be presented within the autonomous vehicle while maintaining an autonomous operational mode, the alert indicating one or more locations in the external environment which correspond to the acquired driving environment data that is determined to be unreliable.

2. The method of claim 1, wherein the alert is a visual alert, and wherein causing the visual alert to be presented within the autonomous vehicle includes causing the visual alert to be presented on a display within the autonomous vehicle.

3. The method of claim 2, wherein the visual alert includes a graphical representation of the autonomous vehicle and a graphical representation of the one or more portions of the external environment is not reliably detectable by the one or more sensors.

4. The method of claim 1, wherein the alert is a wherein the alert is an audial alert.

5. The method of claim 4, wherein causing the audial alert to be presented within the autonomous vehicle includes causing the audial alert to be presented within the autonomous vehicle in one or more locations that spatially correspond to the one or more locations in the external environment in which the acquired driving environment data that is determined to be unreliable.

6. A method of indicating sensor blind spots for an autonomous vehicle, the method comprising:
   acquiring, using one or more sensors, driving environment data of an external environment of the autonomous vehicle;
   determining whether one or more portions of the acquired driving environment data is unreliable, the determining including determining whether sensor data is completely occluded in one or more portions of the external environment of the autonomous vehicle;
   responsive to determining that sensor data is completely occluded in one or more portions of the external environment, causing the autonomous vehicle to transition to a manual operational mode or safety operational mode; and
   causing an alert to be presented within the autonomous vehicle, the alert indicating one or more locations in the external environment which correspond to the acquired driving environment data that is determined to be unreliable.

7. The method of claim 1, further including:
responsive to determining that one or more portions of the acquired driving environment data is unreliable, determining a modification to a current driving maneuver of the autonomous vehicle; and
causing the determined modification to the current driving maneuver of the autonomous vehicle to be implemented.

8. The method of claim 7, wherein the determined modification to a current driving maneuver of the autonomous vehicle includes reducing a current speed of the autonomous vehicle.

9. The method of claim 1, wherein determining whether one or more portions of the acquired driving environment data is unreliable includes:
detecting whether any of the one or more sensors are inoperative or faulting; and
responsive to detecting that any of the one or more sensors are inoperative or faulting, determining that the portion of the acquired driving environment data associated with the inoperative or faulting sensors to be unreliable.

10. A method of indicating sensor blind spots for a vehicle, the method comprising:
acquiring, using one or more sensors, driving environment data of an external environment of the vehicle;
determining whether one or more portions of the acquired driving environment data is unreliable, the determining including:
comparing the acquired driving environment data to a map;
determining whether there is a difference between the acquired driving environment data and an expected feature included in the map; and
responsive to determining whether there is a difference between the acquired driving environment data and an expected feature included in the map, determining that that portion of the acquired driving environment data associated with the difference between the acquired driving environment data and an expected feature included in the map to be unreliable; and
responsive to determining that one or more portions of the acquired driving environment data is unreliable, causing an alert to be presented within the vehicle, the alert indicating one or more locations in the external environment which correspond to the acquired driving environment data that is determined to be unreliable.

11. A sensor blind spot indication system for an autonomous vehicle, the system comprising:
one or more sensors configured to acquire driving environment data of at least a portion of an external environment of the autonomous vehicle; and
a processor operatively connected to the one or more sensors, the processor being programmed to initiate executable operations comprising:
determining whether one or more portions of acquired driving environment data is unreliable, the determining including:
determining whether one or more physical objects or barriers in the external environment occlude portions of the external environment from being detected by at least one of the one or more sensors; and
responsive to determining that one or more physical objects or barriers in the external environment occlude portions of the external environment from being detected by at least one of the one or more sensors, determining that the portion of the acquired driving environment data associated with the one or more sensors that are occluded by at least one of one or more physical objects to be unreliable; and
responsive to determining that one or more portions of the acquired driving environment data is unreliable, causing an alert to be presented within the autonomous vehicle while maintaining an autonomous operational mode, the alert indicating one or more locations in the external environment which correspond to the acquired driving environment data that is determined to be unreliable.

12. The system of claim 11, further including a display, wherein the display is operatively connected to the processor, wherein the alert is a visual alert, and wherein causing an alert to be presented within the autonomous vehicle includes causing the visual alert to be presented on the display.

13. The system of claim 11, wherein the alert is a visual alert, and further including:
a projector; and
a projection surface,
wherein causing an alert to be presented within the autonomous vehicle includes causing the projector to present the visual alert on the projection surface.

14. The system of claim 13, wherein the visual alert includes a graphical representation of the autonomous vehicle and a graphical representation of the one or more portions of the external environment is not reliably detectable by the one or more sensors.

15. The system of claim 11, further including a plurality of speakers, wherein the plurality of speakers are operatively connected to the processor, wherein the alert is a audial alert, and wherein causing an alert to be presented within the autonomous vehicle includes causing the audial alert to be presented by one or more of the plurality of speakers.

16. The system of claim 15, wherein causing the audial alert to be presented within the autonomous vehicle includes causing the audial alert to be presented within the autonomous vehicle by one or more of the plurality of speakers in one or more locations that spatially correspond to the one or more locations in the external environment in which the acquired driving environment data that is determined to be unreliable.

17. The system of claim 11, wherein the executable operations further include:
responsive to determining that one or more portions of the acquired driving environment data is unreliable, determining a modification to a current driving maneuver of the autonomous vehicle; and
causing the determined modification to the current driving maneuver of the autonomous vehicle to be implemented.

18. The system of claim 17, wherein the determined modification to a current driving maneuver of the autonomous vehicle includes reducing a current speed of the autonomous vehicle.

19. A computer program product for indicating sensor blind spots for an autonomous vehicle, the computer program product comprising a computer readable storage medium having program code embodied therein, the program code executable by a processor to perform a method comprising:

acquiring, using one or more sensors, driving environment data of an external environment of the autonomous vehicle;
determining whether one or more portions of the acquired driving environment data is unreliable, the determining including:
determining whether one or more physical objects or barriers in the external environment occlude portions of the external environment from being detected by at least one of the one or more sensors; and
responsive to determining that one or more physical objects or barriers in the external environment occlude portions of the external environment from being detected by at least one of the one or more sensors, determining that the portion of the acquired driving environment data associated with the at least one of the one or more sensors that are occluded by one or more physical objects to be unreliable; and
responsive to determining that one or more portions of the acquired driving environment data is unreliable, causing an alert to be presented within the autonomous vehicle while maintaining an autonomous operational mode, the alert indicating one or more locations in the external environment which correspond to the acquired driving environment data that is determined to be unreliable.

20. A sensor blind spot indication system for a vehicle, the system comprising:
one or more sensors configured to acquire driving environment data of at least a portion of an external environment of the vehicle; and
a processor operatively connected to the one or more sensors, the processor being programmed to initiate executable operations comprising:
determining whether one or more portions of acquired driving environment data is unreliable, the determining including:
comparing the acquired driving environment data to a map;
determining whether there is a difference between the acquired driving environment data and an expected feature included in the map; and
responsive to determining whether there is a difference between the acquired driving environment data and an expected feature included in the map, determining that that portion of the acquired driving environment data associated with the difference between the acquired driving environment data and an expected feature included in the map to be unreliable; and
responsive to determining that one or more portions of the acquired driving environment data is unreliable, causing an alert to be presented within the vehicle, the alert indicating one or more locations in the external environment which correspond to the acquired driving environment data that is determined to be unreliable.

21. A computer program product for indicating sensor blind spots for a vehicle, the computer program product comprising a computer readable storage medium having program code embodied therein, the program code executable by a processor to perform a method comprising:
acquiring, using one or more sensors, driving environment data of an external environment of the vehicle;
determining whether one or more portions of the acquired driving environment data is unreliable, the determining including:
comparing the acquired driving environment data to a map;
determining whether there is a difference between the acquired driving environment data and an expected feature included in the map; and
responsive to determining whether there is a difference between the acquired driving environment data and an expected feature included in the map, determining that that portion of the acquired driving environment data associated with the difference between the acquired driving environment data and an expected feature included in the map to be unreliable; and
responsive to determining that one or more portions of the acquired driving environment data is unreliable, causing an alert to be presented within the vehicle, the alert indicating one or more locations in the external environment which correspond to the acquired driving environment data that is determined to be unreliable.

22. A method of indicating sensor blind spots for an autonomous vehicle, the method comprising:
acquiring, using one or more sensors, driving environment data of an external environment of the autonomous vehicle;
determining whether one or more portions of the acquired driving environment data is unreliable, the determining including:
determining whether map data is available for a current external environment of the autonomous vehicle; and
responsive to determining that map data is not available for at least a portion of the current external environment of the autonomous vehicle, determining that the acquired driving environment data associated with the at least a portion of the current external environment of the autonomous vehicle for which map data is not available to be unreliable; and
responsive to determining that one or more portions of the acquired driving environment data is unreliable, causing an alert to be presented within the autonomous vehicle while maintaining an autonomous operational mode, the alert indicating one or more locations in the external environment which correspond to the acquired driving environment data that is determined to be unreliable.

23. A sensor blind spot indication system for an autonomous vehicle, the system comprising:
one or more sensors configured to acquire driving environment data of at least a portion of an external environment of the autonomous vehicle; and
a processor operatively connected to the one or more sensors, the processor being programmed to initiate executable operations comprising:
determining whether one or more portions of acquired driving environment data is unreliable, the determining including:
determining whether map data is available for a current external environment of the autonomous vehicle; and
responsive to determining that map data is not available for at least a portion of the current external environment of the autonomous vehicle, determining that the acquired driving environment data associated with the at least a portion of the current external environment of the autonomous vehicle for which map data is not available to be unreliable; and responsive to determining that one or more portions of the acquired driving environment data is unreliable, causing an alert to be presented within the autonomous vehicle while maintaining an autonomous operational mode, the alert indicating one or more locations in the external environment which correspond to the acquired driving environment data that is determined to be unreliable.

24. A method of indicating sensor blind spots for an autonomous vehicle, the method comprising:
    acquiring, using one or more sensors, driving environment data of an external environment of the autonomous vehicle;
    determining whether one or more portions of driving environment data is unreliable, the determining including:
        determining whether one or more environment sensors is off or deactivated;
        responsive to determining that one or more environment sensors is off or deactivated, determining that the portion of the driving environment data associated with the one or more environment sensors that are off or deactivated to be unreliable; and
    responsive to determining that one or more portions of the driving environment data is unreliable, causing an alert to be presented within the autonomous vehicle while maintaining an autonomous operational mode, the alert indicating one or more locations in the external environment which correspond to the driving environment data that is determined to be unreliable.

25. A sensor blind spot indication system for an autonomous vehicle, the system comprising:
    one or more sensors configured to acquire driving environment data of at least a portion of an external environment of the autonomous vehicle; and
    a processor operatively connected to the one or more sensors, the processor being programmed to initiate executable operations comprising:
        determining whether one or more portions of driving environment data is unreliable, the determining including:
            determining whether one or more environment sensors is off or deactivated; and
            responsive to determining that one or more environment sensors is off or deactivated, determining that the portion of the driving environment data associated with the one or more environment sensors that are off or deactivated to be unreliable; and
        responsive to determining that one or more portions of the driving environment data is unreliable, causing an alert to be presented within the autonomous vehicle while maintaining an autonomous operational mode, the alert indicating one or more locations in the external environment which correspond to the driving environment data that is determined to be unreliable.

26. A sensor blind spot indication system for an autonomous vehicle, the system comprising:
    one or more sensors configured to acquire driving environment data of at least a portion of an external environment of the autonomous vehicle; and
    a processor operatively connected to the one or more sensors, the processor being programmed to initiate executable operations comprising:
        determining whether one or more portions of acquired driving environment data is unreliable, the determining including determining whether sensor data is completely occluded in one or more portions of an external environment of the autonomous vehicle;
        responsive to determining that sensor data is completely occluded in one or more portions of the external environment, causing the autonomous vehicle to transition to a manual operational mode or safety operational mode; and
        causing an alert to be presented within the autonomous vehicle, the alert indicating one or more locations in the external environment which correspond to the acquired driving environment data that is determined to be unreliable.

* * * * *